United States Patent

[11] 3,547,187

[72] Inventors Reginald Kenneth Cook
Preston, Weymouth, Dorset;
Samuel Brittan Hosegood, Arne, Wareham, Dorset, England
[21] Appl. No. 551,797
[22] Filed May 20, 1966
[45] Patented Dec. 15, 1970
[73] Assignee United Kingdom Atomic Energy Authority, London, England
[32] Priority June 15, 1965
[33] Great Britain
[31] No. 25,317/65

[54] HEAT EXCHANGERS
8 Claims, 5 Drawing Figs.
[52] U.S. Cl. ................................. 165/76, 122/510, 122/32, 165/145
[51] Int. Cl. ................................. F28f 7/00
[50] Field of Search .......................... 165/74, 145, 32, 510; 122/32, 510

[56] References Cited
UNITED STATES PATENTS

| | | | |
|---|---|---|---|
| 3,338,301 | 8/1967 | Romanos | 122/32X |
| 3,308,878 | 3/1967 | Durst et al. | 122/32X |
| 2,672,849 | 3/1954 | Fruit | 122/333 |
| 3,013,773 | 12/1961 | Campbell | 165/145 |
| 3,153,444 | 10/1964 | Purdy et al. | 122/32X |
| 3,280,905 | 10/1966 | Costes | 122/510X |

*Primary Examiner*—Robert A. O'Leary
*Attorney*—Larson, Taylor and Hinds

ABSTRACT: An arrangement of tubes in a tube bank wherein the tubes are grouped into generally flat arrays, groups of parallel arrays forming a stack wherein the arrays of one stack are perpendicular to the arrays of another stack. The tubes can be inserted individually, in sequence, through a relatively small opening of the chamber wherein, in the operating position of the tube bank the main heat transfer parts of the tube occupy a large cross-sectional area of the chamber while inlet and outlet parts of the tubes are bundled together in line with the small opening.

HEAT EXCHANGERS

The present invention concerns tube banks for a nuclear reactor heat exchanger and also concerns nuclear reactors.

In nuclear reactors for power generation, particularly when a prestressed concrete reactor pressure vessel is used, it is advantageous to enclose the entire primary coolant circuit, including the heat exchangers i.e. steam generators, inside the reactor vessel.

There are obvious advantages in arranging the heat exchangers so that they can be removed and replaced when desired, but entry to the reactor vessel to make and break pipe joints may be difficult or impossible.

According to the present invention a tube bank is designed as a number of discrete tube arrays being formed as a unit adapted to be introduced through a penetration in a vessel and then to be dressed as a plurality of stacks (the arrays in one stack being perpendicular to those in another stack) each array having extended inlet and outlet pipes positioned to permit each array to be moved separately in sequence to a predetermined position and to be moved through the penetration to permit servicing.

An embodiment of the invention will now be described by way of example with reference of the accompanying drawings in which.

Figure 1:
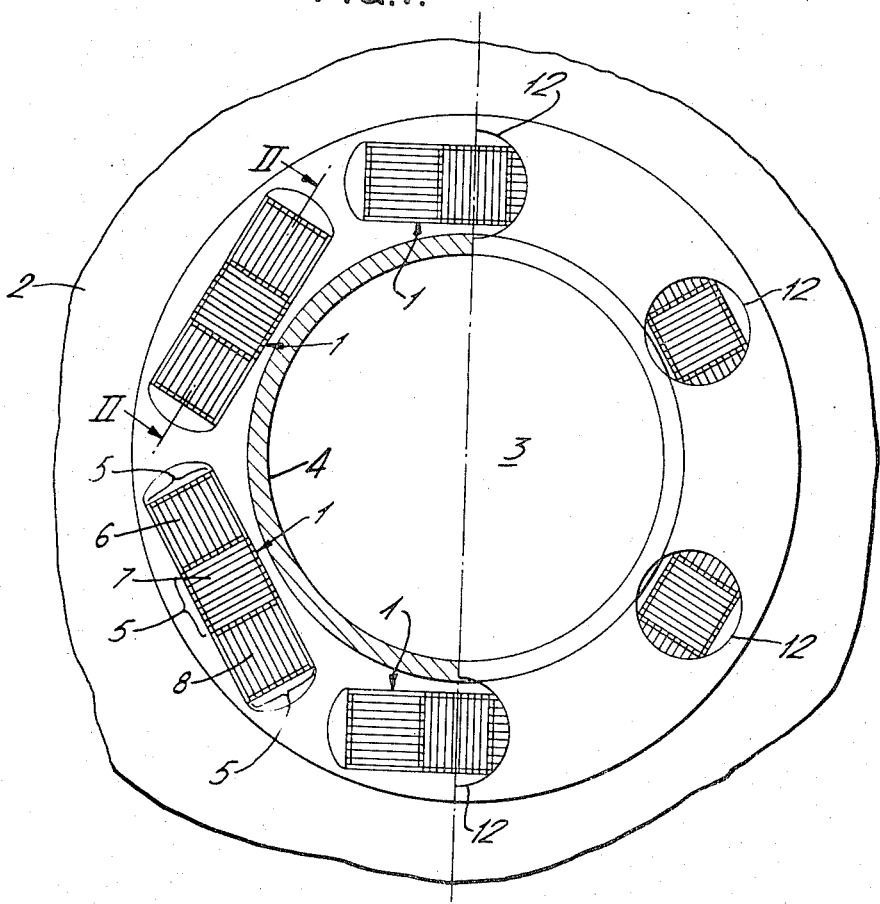
FIG. 1 is a plan view, part in section, of a nuclear reactor incorporating tube banks according to the invention.

In FIG. 1, six heat exchangers 1 are equally spaced within a nuclear reactor pressure vessel 2 around the central core space 3. These heat exchangers may be arranged in primary coolant ducts formed in the wall of the pressure vessel or as shown in separate boiler casings in an annular boiler chamber divided from the space by a shield wall 4.

Figure 2:
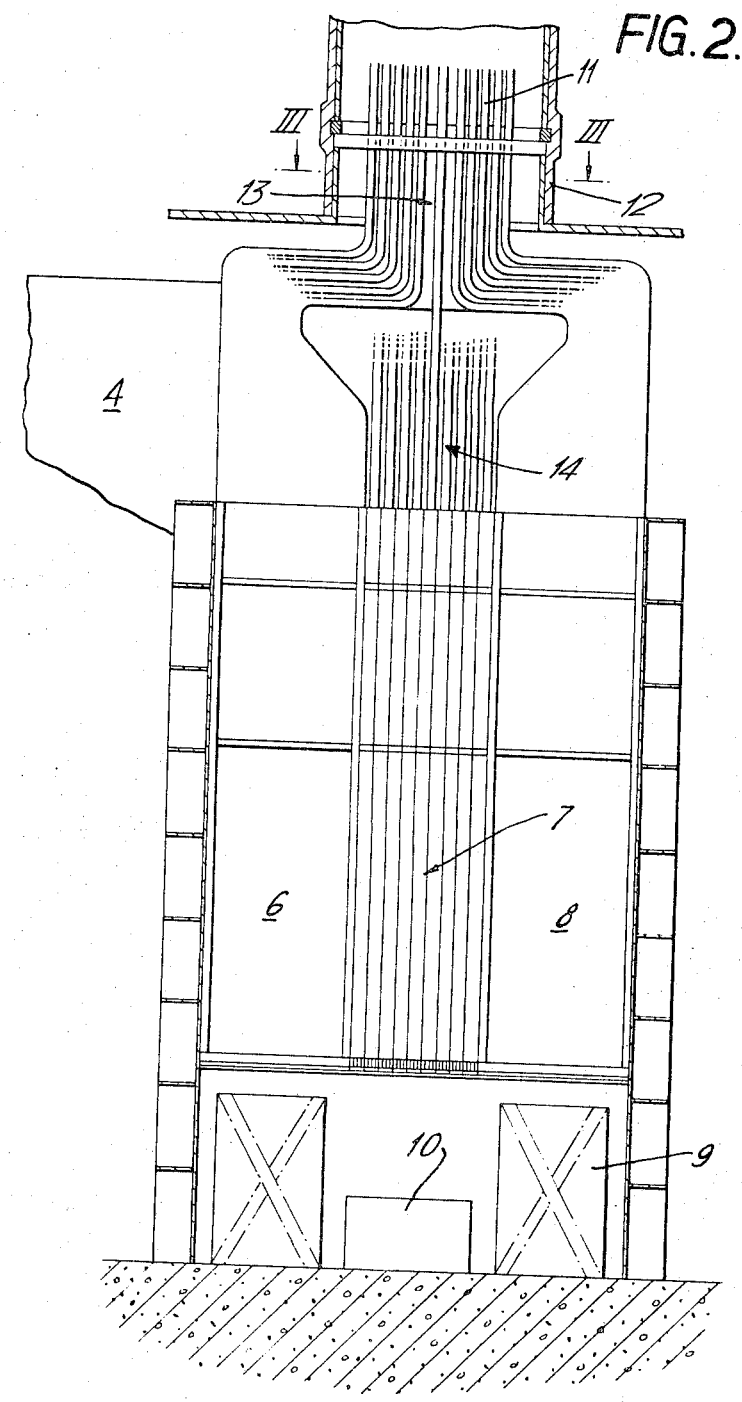
FIG. 2 is an enlarged cross section along line II–II of FIG. 1.

The secondary coolant tube banks are designed as a number of discrete flat tube arrays 5 which are assembled in three stack 6, 7, 8. The tube arrays in each of the outer stacks 6, 8 are perpendicular to those in the inner stack 7. All the tube arrays are supported within the primary coolant duct by stools 9 (FIG. 2) and a circulator 10 is provided to cause the primary coolant to flow through the tube bank.

Each flat tube array is a complete boiler unit in itself, containing economizer evaporator, superheater and reheater sections. The individual arrays are connected in parallel to headers outside the reactor pressure vessel.

The inlet and outlet risers 11 from the tube arrays are bunched to permit of their being led through a comparatively small diameter access hole 12 in the vessel wall, which hole is, however, big enough to allow the passage of one tube array and in the preferred embodiment is slightly larger than the diagonal of one stack.

Figure 3:
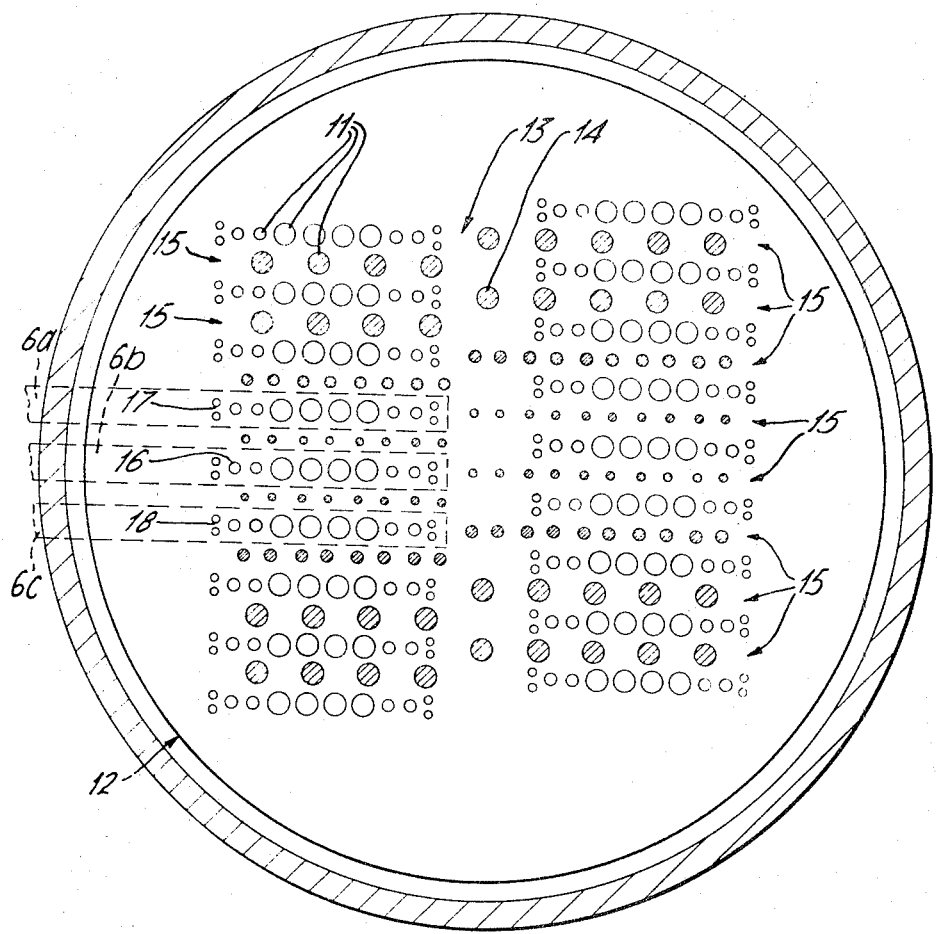
FIG. 3 is an enlarged cross section along line III–III of FIG. 2.
Figure 4:
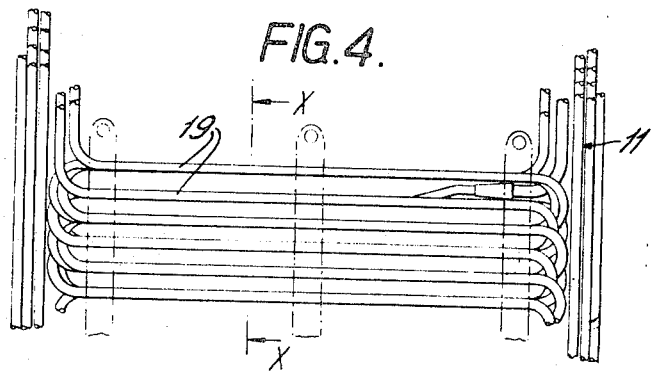
FIG. 4 is a scrap detail view of a tube array.

The inlet and outlet risers 11 are positioned as shown in FIG. 3 to permit each tube array 5 to be moved in sequence to a predetermined position and to be removed therefrom to permit servicing. The risers appertaining to the tubes in the centre stack 7 are shown cross hatched. The risers from the outer stacks pass through the hole on each side of a central passage 13, passage 13 is occupied exclusively by the risers 14 of the array formed by the centre stack 7. This central passage is coextensive with a diametric plane of the access hole and the central tube array of the stack 7 can therefore be lifted out from the primary coolant duct through the access hole. The risers of the outer stacks 6 and 8 are also positioned to leave lanes 15 through which the risers 14 (shown cross hatched) of the other arrays in the central stack 7 pass. In addition the risers of one outer stack 6 are offset with respect to those of the other 8 so that the risers of each outer stack 6, 8 can pass into the lanes 15 left between the risers of the other stack after removal of the central stack 7. To remove the outer stacks, in particular stack 6 of which three arrays 6a, 6b, 6c are shown, after removal of the central stack 7, the tube risers 16 from array 6b is moved to the right in FIG. 3 into the lane formed between the nearest tube arrays in the other outer stack 7 until it reaches a position in which it occupies lane 15. From this position the array 6b can be lifted through the access hole, then tube risers 17 and 18 associated with arrays 6a, 6c respectively are displaced in turn into the position previously occupied by riser 16 so that they can both in turn be moved to the right and then lifted clearly through the access hole. The process is repeated for each pair of arrays from the left-hand stack after which those from the right-hand stack can be dealt with in a similar manner.

Figure 4A:
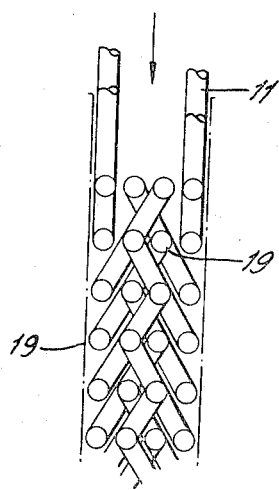
FIG. 4A is an enlarged cross section on line X–X of FIG. 4.

Preferably each tube array has a number of separate channels 19 which can be blanked off individually or in groups by plugs in respective inlet and outlet risers outside the vessel. These channels are interleaved in their array as shown in FIG. 4A so no direct path for the gas flowing through an array in the direction indicated is uncooled even when a number of channels are blanked off.

The individual channels can be connected together in any desired manner outside the access hole. Normally stress bearing tube supports would be provided but these are not shown in the drawings for fear that their inclusion might unduly complicate the drawings.

Modifications are possible to this embodiment, for example instead of using three stacks, one could be omitted and only two used provided that the primary coolant duct was suitable for the tube bank used.

The embodiment described above provides a method by which heat exchangers can be installed in or removed from such a reactor vessel without the need for entry of personnel to the vessel, since all the pipe joints can be made externally.

Moreover the penetrations or holes in the vessel wall are kept to a minimum.

We claim:

1. A heat exchanger comprising a vessel defining a chamber, a restricted access opening in said vessel, a tube bank designed as a number of discrete tube arrays, each array being generally flat and formed as a unit shaped to be introduced through said restricted access opening and then to be arranged as a plurality of stacks, the generally flat arrays in each stack being generally parallel to each other, the generally flat arrays in one stack being substantially perpendicular to the generally flat arrays in another stack of the bank, each array having inlet and outlet pipes extending through the restricted access opening, said inlet and outlet pipes being arranged in said access opening to permit each array to be moved separately in sequence to a predetermined position and to be removed through the access opening to permit servicing.

2. A tube bank as claimed in claim 1 in which each tube array is a complete boiler unit containing economizer, evaporator, superheater and reheater sections, the individual arrays being connected in parallel to headers outside the vessel.

3. A heat exchanger comprising a vessel defining a chamber, a restricted access opening in said vessel permitting entry to the chamber in a certain direction, a tube bank designed as a number of discrete generally flat tube arrays which are assembled in a plurality of stacks, the generally flat arrays in each stack being generally parallel to each other and extending parallel to said direction, the arrays in one stack being perpendicular to those in another stack, each array having inlet and outlet pipes positioned to permit each tube array to be moved through the access opening in sequence to a predetermined position and to be removed therefrom to permit servicing.

4. A heat exchanger restricted a vessel constituting a flow-path for one fluid, a restricted opening in said vessel affording restricted access to said vessel, a plurality of elongated tube arrays in said vessel, each array sufficiently small in the direction transverse to the said elongated direction to pass through said opening, into said vessel all arrays including riser pipes which protrude through the opening after the arrays are positioned within said capacity so as to form stacks of such arrays, wherein a portion of at least one array is spaced laterally from and is thus out of alignment with said opening.

5. A heat exchanger as claimed in claim 4 in which the tube arrays are formed into stacks, one stack occupying the position directly in front of said opening, the other stacks displaced laterally from the area of the opening.

6. A heat exchanger comprising a vessel having an opening affording restricted access to the vessel, a tube bank which in its operative position comprises a first portion and a second portion, the first portion comprising the main heat transfer parts of the tubes and occupying a cross-sectional area greater than that of the opening, and the second portion of the bank comprising the inlet and outlet lengths of the tubes and occupying a cross-sectional area no greater than the said opening and opposing said opening, the tubes being arranged in a plurality of generally flat arrays, the arrays being so shaped so to be inserted individually in sequence through said opening to the positions which they occupy in the operative position of the bank, at which operative position said heat transfer parts occupy said cross-sectional area greater than that of the opening and from which position they may be withdrawn in a reverse sequence.

7. A heat exchanger as claimed in claim 6 in which at least one said flat array lies in its operative position within the casing at right angles to another flat array.

8. A tube bank as claimed in claim 7 wherein the heat transfer parts of the tubes of one array occupy positions directly in line with said opening while the heat transfer parts of the tubes of the other arrays are displaced laterally from the opening in the vessel.